350-357 $$$ SR

2/14/78 XR 4,074,256

United States Patent [19]

Sekiya et al.

[11] 4,074,256

[45] Feb. 14, 1978

[54] DRIVER CIRCUIT FOR DRIVING ELECTROCHROMIC DISPLAY DEVICE

[75] Inventors: Fukuo Sekiya; Heihachiro Ebihara, both of Tokorozawa, Japan

[73] Assignee: Citizen Watch Company Limited, Tokyo, Japan

[21] Appl. No.: 715,523

[22] Filed: Aug. 18, 1976

[30] Foreign Application Priority Data

| | | |
|---|---|---|
| Aug. 20, 1975 | Japan | 50-100231 |
| Dec. 16, 1975 | Japan | 50-149079 |

[51] Int. Cl.[2] G06F 3/14; G09F 9/32

[52] U.S. Cl. 340/336; 340/324 R; 350/357; 58/50 R

[58] Field of Search 340/324 R, 336; 350/160 R, 160 P, 160 LC; 58/152 R, 50 R, 57

[56] References Cited

U.S. PATENT DOCUMENTS

| | | | |
|---|---|---|---|
| 3,245,313 | 4/1966 | Zaromb | 340/160 R |
| 3,476,460 | 11/1969 | Hansen et al. | 340/324 R |
| 3,736,043 | 5/1973 | Sambucetti | 340/336 |
| 3,892,472 | 7/1975 | Giglia | 350/160 R |
| 3,934,241 | 1/1976 | Weigert | 340/324 R |

*Primary Examiner*—Marshall M. Curtis

*Attorney, Agent, or Firm*—Holman & Stern

[57] ABSTRACT

A driver circuit for driving an electrochromic display device having switching elements connected between a power source and the electrodes of the electrochromic display device. The driver circuit includes a data controller which converts a display information signal to a signal indicating a state of non-display in response to a display erase signal applied to a control terminal. A drive signal generator is responsive to the signal from the data controller to produce a bleaching signal by which a display of the electrochromic display device is erased.

21 Claims, 18 Drawing Figures

DRIVER CIRCUIT FOR DRIVING ELECTROCHROMIC DISPLAY DEVICE

This invention relates to an electronic device equipped with an electrochromic (hereinafter referred to as EC) display device and, more particularly, to a driver circuit for such display device.

EC display devices have recently been proposed as electro-optical display means. It is well known that such EC display devices possess a memory or persistence function and consume more electrical power than liquid crystals when they conduct.

In electronic devices such as electronic timepieces which employ small batteries as a power source, it is desirable to stop the supply of power to the display mechanism whenever a display is unnecessary in order to reduce battery consumption. This is accomplished in LED and liquid crystal display devices by terminating the supply of power to the display mechanism with the circuits remaining in the actuated state. This enables the display to be erased and conserves energy. By way of example, the counting circuits in an LED timepiece normally continue to conduct and an electric current is applied to the display mechanism only when the time is read. A similar method has also been proposed for EC display devices. However, when the flow of current to the EC display device is terminated in order to reduce power consumption, the information prior to such termination of current continues to be displayed by the EC display device due to its persistence so that a time-reading error is likely to result. Moreover, when the current is cut off for a long period of time an indistinct or unsightly display may gradually appear. Another problem resides in the fact that a display is disrupted whenever a battery is replaced. This may be understood from the fact that the EC display device due to its persistence continues to display information present at the time the battery was removed. The driver circuits on the other hand do not possess such a memory function so that the information as designated by the circuits and the information as it appears on the display of the EC display device differ.

It is, therefore, an object of the present invention to overcome the above-mentioned problems by providing a driver circuit adapted for selectively erasing the entire display of an EC display device.

It is another object of this invention to provide a driver circuit equipped with means for displaying immediately after removal of a display erasure signal.

It is another object of this invention to provide a driver circuit for reducing the amount of power necessary for the erasure of the display and for preventing an excess flow of current through an EC display device.

It is another object of this invention to provide a driver circuit for automatically erasing a display whenever a battery is replaced by erasing the display in response to a detection signal produced by means for detecting the installation of a power source.

It is still another object of this invention to provide a driver circuit for reducing power consumption when a display is not required and for preventing the appearance of an unsightly or indistinct display by performing a display erasure through the manipulation of an external control member.

It is still another object of this invention to provide a driver circuit for automatically erasing a display whenever a battery is replaced, for reducing power consumption when a display is not required, and for preventing the appearance of an unsightly or indistinct display, these functions being accomplished by erasing the display in response to both a detection signal produced by means for detecting the installation of a power source and an output signal produced by a switch for erasing the display.

It is still another object of this invention to provide a driver circuit for rapidly erasing a display through means which cause a current to flow through all the segments of an EC display device in a direction as will bleach them.

It is still another object of this invention to provide a driver circuit for reducing the amount of power necessary for erasing a display, this function being accomplished by means which short-circuit all the electrodes of an EC display device.

It is still another object of this invention to provide a driver circuit which substantially reduces the amount of power required to erase a display and which rapidly erases a display, these functions being accomplished by means which cause a current to flow through all the segments of an EC display device, after all the electrodes have short-circuited, in a direction as will bleach the segments.

These and other objects, features and advantages of the present invention will become more apparent from the following description when taken in conjunction with the accompanying drawings, in which.

Figure 1:
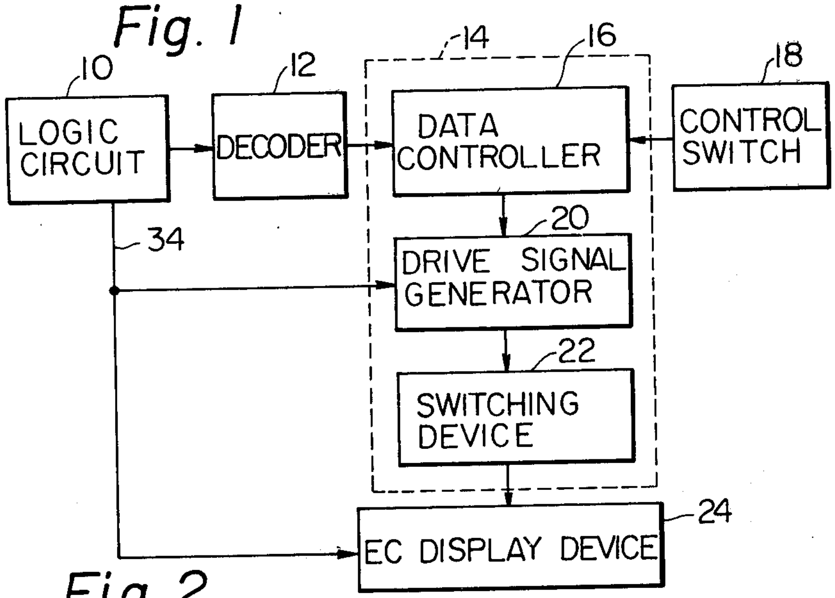
FIG. 1 is a block diagram of an electronic device equipped with a driver circuit according to the present invention.

Referring now to FIG. 1, there is shown in a block diagram of one preferred embodiment of an electronic device equipped with a driver circuit for an electrochromic display device. In FIG. 1, the electronic device comprises logic circuit 10 adapted to provide logic information, which is supplied to decoder 12. Logic circit 10 may be, for example, an electronic timepiece or a desk calculator. Decoder 12 converts logic information from logic circuit 10 into various display information signals, which are supplied to driver circuit 14. Driver circuit 14 includes data controller 16, through which the display information signals are allowed to pass to drive signal generator 20 which generates drive signals in response to the display information signals and a clock signal delivered from logic circuit 10. The drive signals are applied to switching device 22, which is operative to apply a potential upon each electrode of EC display device 24 and thus controls the flow of an electric current therethrough.

Data controller 16 is controlled by a display erase signal delivered from control switch 18 to convert the display information signals to signals indicative of a state of non-display. It will thus be possible to selectively cause drive signal generator 20 to generate a bleaching signal to erase the entire display of EC display device 24.

Figure 2:
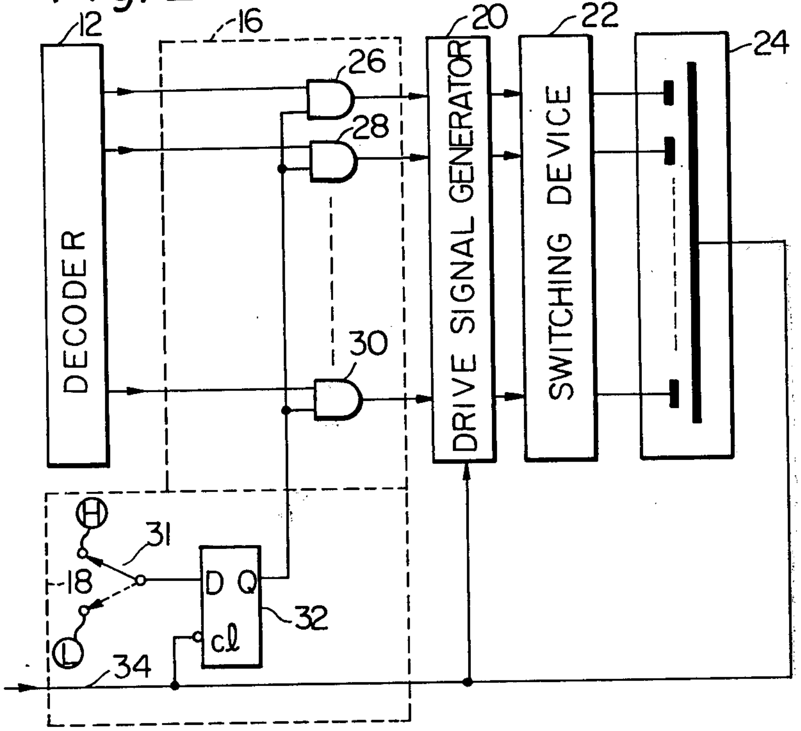
FIG. 2 is an example of detail circuitry for a data controller forming part of the driver circuit shown in FIG. 1.

FIG. 2 shows an example of data controller 16 forming part of driver circuit 14 of FIG. 1. In FIG. 2, data controller 16 includes gate means such as AND gates 26, 28 and 30, each of which has one input coupled to receive the display information signals from decoder 12 and another input serving as a control input coupled to control switch 18. Control switch 18 comprises switch 31 and synchronizing circuit 32 coupled thereto. Synchronizing circuit 32 comprises a data-type-flip-flop having its data input terminal coupled to switch 31 and its clock input terminal coupled to receive a clock signal from logic circuit 10 via line 34.

Switch 31 may comprise an external control member for erasing the display and is usually connected to the high potential side H of a power source. Connection to the low potential side L is made when erasing the display. A truth table for the operation of data type flipflop 32 (referred to hereinafter as D-FF 32) may be constructed as follows:

Table 1

| Cl | D | $Q_n$ |
|---|---|---|
| ↓ | H | H |
| ↓ | L | L |
| ↑ | X | $Q_{n-1}$ |

The output signal from switch 31 is applied to the data input terminal of D-FF 32 and a clock signal from logic circuit 10 is applied to the clock input terminal via line 34. Accordingly, when the clock signal and the output signal from switch 31 are respectively as denoted by waveforms CL and SO in FIG. 4, the output of D-FF 32 is synchronized with the clock signal and denoted by waveform FO. The output signal from switch 31 is thus synchronized with the clock signal CL in this fashion in order to also synchronize it with a conduction signal produced in the driver circuit for supply to EC display device 24. This ensures a conduction interval for erasing the display.

In FIG. 2, a display information signal from decoder 12 is applied to one input terminal of AND gates 26, 28 and 30, and a display erase signal from control switch 18 is applied to the other input terminal of these gates whereby a signal representing the logical product of the display information signal and display control signal is produced and fed to drive signal generator 20. AND gates 26, 28 and 30 provide display information signals as outputs during the interval that switch 31 is connected to the high potential side H of the power source so that EC display device 24 is driven in response to the display information signals. When switch 31 is connected to the low potential side L of the power source, the output signals provided by AND gates 26, 28 and 30 all attain a low logic level. As a result, driver signal generator 20 generates a bleaching signal to cause a current to flow in a bleach-inducing direction through such segments of EC display device 24, thereby completely erasing the display.

Figure 3:
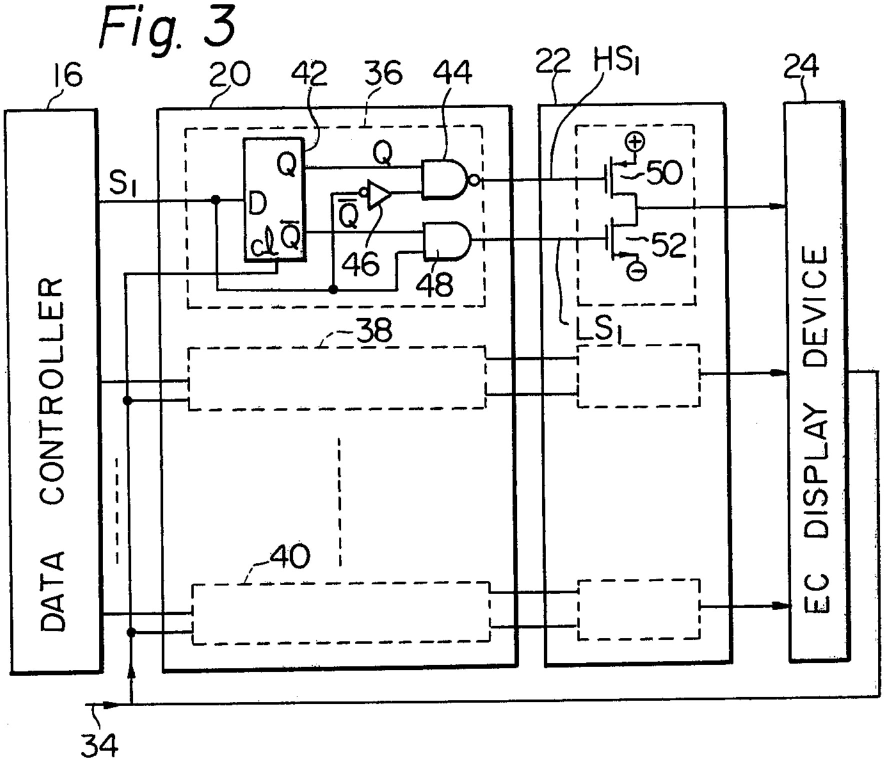
FIG. 3 is an example of detail circuitry for a drive signal generator and a switching device forming part of the driver circuit shown in FIG. 1.

FIG. 3 shows an example of detail circuitry for drive signal generator 20 and switching device 22. In FIG. 3, the drive signal generator 20 comprises blocks 36, 38 and 40 having inputs coupled to data controller 16 and outputs coupled to switching device 22 connected to segment electrodes of EC display device 24. Block 36 comprises latch circuit 42 for storing a display information signal from data controller 16 and generating an output signal delayed in phase from the display information signal. The latch circuit has the data input terminal coupled to data controller 16 to receive a display information signal $S_1$ therefrom. the clock input terminal of latch circuit 42 is coupled to logic circuit 10, to receive a clock signal CL therefrom via line 34. The Q output of latch circuit 42 is coupled to one input of NAND gate 44 which serves as a bleaching signal generating means, whose another input is coupled through inverter 46 to data controller 16, to generate a bleaching signal. The $\overline{Q}$ output of latch circuit 42 is coupled to one input of AND gate 48 which serves as a coloration signal generating means, whose another input is coupled to data controller 16, to generate a coloration signal. The output of NAND gate 44 is coupled to first switching means 50 of switching device 22, and the output of AND gate 48 is coupled to second switching means 52 of switching device 22. The first switching means 50 comprises a P-channel metal oxide semiconductor field-effect transistor (P-channel MOSFET) having its source terminal coupled to the positive potential side of the power source. The second switching means 52 comprises an N-channel metal oxide semiconductor field-effect transistor (N-channel MOSFET) having its source terminal coupled to the negative potential side of the power source. The drain terminals of the MOSFETs 50 and 52 are coupled together and connected to the segment electrode of EC display device 24.

The operation of the latch circuit 42 is exemplified in the following Table 2:

Table 2

| Cl | D | $Q_n$ | $\overline{Q}_n$ |
|---|---|---|---|
| H | H | H | L |

Table 2-continued

| Cl | D | $Q_n$ | $\overline{Q_n}$ |
|---|---|---|---|
| H | L | L | H |
| L | X | $Q_{n-1}$ | $\overline{Q_{n-1}}$ |

Figure 4:
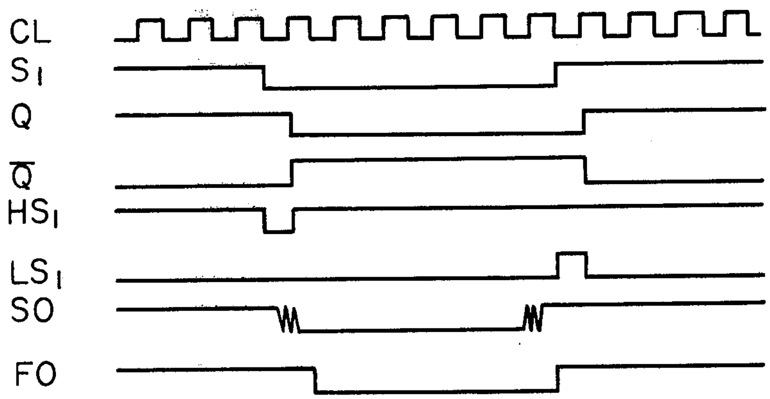
FIG. 4 is a timing chart for illustrating the operation of the circuits shown in FIGS. 2 and 3.

In operation, the display information signal $S_1$ is applied to the data input terminal of latch circuit 42 and the clock signal CL to the clock input terminal. As can be seen in FIG. 4, the output signal Q from latch circuit 42 lags behind the signal $S_1$ by an interval equivalent to one-half the cycle of the clock signal CL output signal $\overline{Q}$ is the inverse of the signal Q. Signal $S_1$ when at a high logic level indicates that a segment is to be colored; a low logic level indicates bleaching. Each gate circuit employes these signals to produce signals $HS_1$ and $LS_1$. Signal $HS_1$ is a negative pulse equivalent to one-half the cycle of the clock signal CL and is produced synchronously with the falling edge of signal $S_1$. When signal $HS_1$ attains a low logic level, P-channel MOSFET 50 conducts. As a result, segment electrode is connected to the positive potential and a current flows through the segment in a direction which induces the bleached state. Signal $LS_1$ is a positive pulse equivalent to one-half the cycle of the clock signal CL and is produced synchronously with the rising edge of signal $S_1$. When signal $LS_1$ attains a high logic level N-channel MOSFET 52 conducts. As a result, segment electrode is connected to the negative potential and a current flows through the segment in a direction which induces the colored state.

Figure 5:
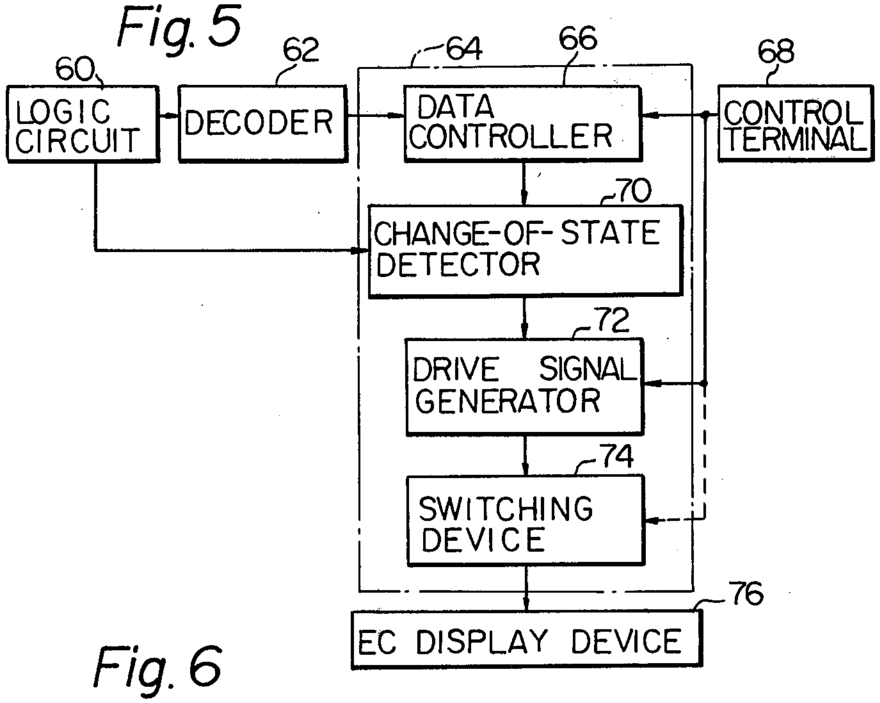
FIG. 5 is a block diagram of another preferred embodiment of an electronic device according to the present invention.

FIG. 5 shows a block diagram of another preferred embodiment of a driver circuit for an electrochromic display device. In FIG. 5, logic information from logic circuit 60 is supplied to decoder 62, which converts the logic information to display information signals. The display information signals are fed to driver circuit 64. Driver circuit 64 includes data controller 66 which is responsive to a display erase signal delivered from control terminal 68 to convert the display information signals to a signal indicative of a state of non-display. The display erase signal is produced by short-circuiting the power source to control terminal 68 by means of a conductor such as tweezers. Change-of-state detector 70 detects a change of state in the output signal produced by data controller 66 and generates a detection signal. Drive signal generator 72 responds to this detection signal and the display erase signal and generates a drive signal for controlling switching device 74. Switching device 74 is responsive to the drive signal for applying a prescribed potential upon each segment electrode of EC display device 76 and thus controls the flow of electric current therethrough.

As already described, a change in state of the display information signal is detected by detector 70 which then applies an output to drive signal generator 72. Accordingly, a drive signal is generated only when there is a change-over in the state of the display information signal to be displayed. Further, although the output signal produced by data controller 66 is converted to a signal indicating a state of non-display in response to a display erase signal from control terminal 68, removal of the display erase signal allows a restoration of the original display information signal. since change-of-state detector 70 detects this restoration as a change of state, the restoration in effect causes a drive signal to be produced. Thus when the display erase signal which has erased the entire display of the EC display device is removed, the content of logic circuit 60 is immediately displayed.

Figure 6:
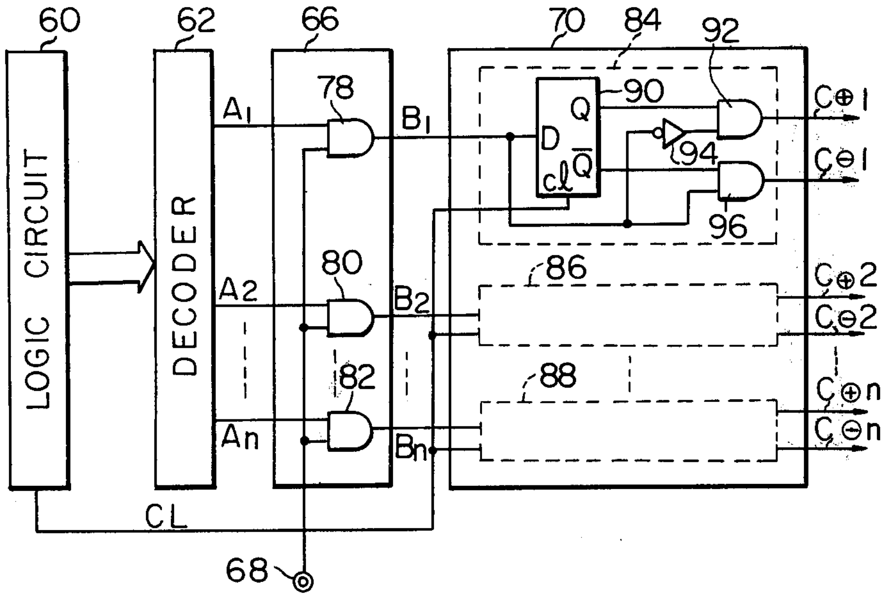
FIG. 6 is an example of detail circuitry for a data controller and a change-of-state detector forming part of the driver circuit shown in FIG. 5.
Figure 7:
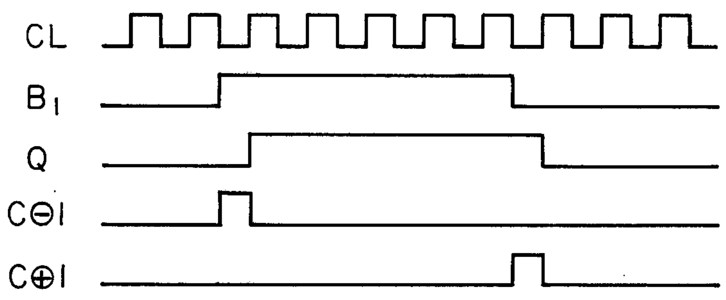
FIG. 7 is a timing chart for illustrating the operation of the circuit shown in FIG. 6.

FIG. 6 illustrates an example of detail circuitry for data controller 66 and change-of-state detector 70, and FIG. 7 shows the corresponding timing chart. In FIG. 6 data controller 66 is constructed by AND gates 78, 80 and 82. Outputs A1, A2, . . . An provided by decoder 62 are applied to one input terminal of each AND gate while the remaining input terminals of the AND gates are connected to control terminal 68. Change-of-state detector 70 is constructed by blocks 84, 86 and 88 each of which is provided respectively with output signals B1, B2, . . . Bn from data controller 66 and clock signals CL from logic circuit 60. Blocks 84, 86 and 88 are identically constructed. Signal B1 is applied to data input terminal D of latch circuit 90, and a clock signal CL is applied to clock input terminal C1. The output signal Q from latch circuit 90 is applied to one input terminal of AND gate 92 and signal B1 is applied across inverter 94 to the other input terminal. This causes an output signal C+1 to be produced. On the other hand, output signal $\overline{Q}$ from latch circuit 90 is applied to one input of AND gate 96 and signal B1 is applied to the other input terminal. This causes an output signal C−1 to be produced. Output signals A1, A2, . . . An provided by decoder 62 supply display information which indicates the states to be displayed by each segment of the EC display device. Signals at a high logic level indicate that a colored state is to be attained while a low logic level indicates that a bleached state is to be attained.

A display erase signal which is normally at a high logic level but which initiates an erasing operation when at a low logic level is applied from control terminal 68. When this signal is at a high level, the B signals are identical with the A signals. When the display erase signal is at a low levle, all of the B signals assume a low logic level and thus are converted to signals which indicate a state of non-display. When the display erase signal returns to its normal state which is at a high level, the B signals once again are identical with the A signals. Thus at this time B signals corresponding to A signals which are at a high level are raised from a low to a high logic level. Change-of-state detector 70 is responsive to this change and produces a detection signal which is fed to the drive signal generator. As a result the driver circuit according to this invention makes it possible for the display as designated by decoder 62 to appear on EC display device 76 immediately after the state inducing the display erasure is removed.

When block 84 is supplied with a clock signal CL and signal B1 as shown in FIG. 7, the output signal Q of latch circuit 90, the output signal C+1 from AND gate 92 and the output signal C−1 from AND gate 96 assume the waveforms as shown. As is apparent from FIG. 7, signal C+1 and signal C−1 are the signals which result with the detection of the respective falling edge and rising edge of signal B1. Similarly, signals C+2, . . . C+n and signals C−2, . . . C−n are the signals which result with the detection of the respective falling edge and rising edge of signals B2 . . . Bn. These signals are supplied to drive signal generator 72. Thus by applying the signals which are produced upon detecting the rising and falling edges of the B signals to drive signal generator 72, it is possible to cause a current to flow only through such segments of EC display device 76 as are to undergo a change of state.

Figure 8:
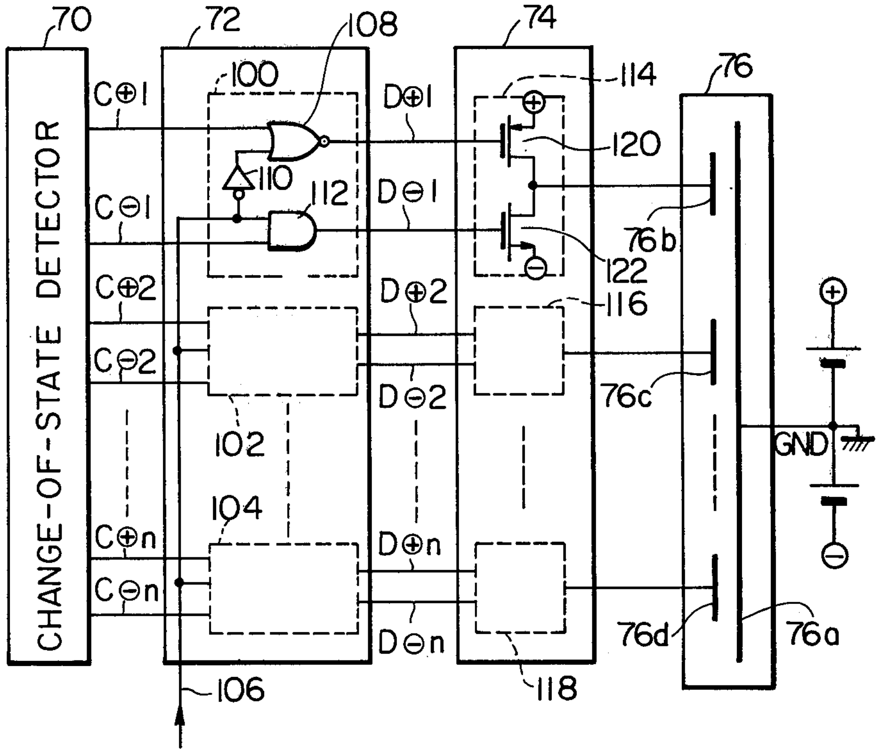
FIG. 8 is an example of detail circuitry for a drive signal generator and a switching device forming part of the device shown in FIG. 5.

FIG. 8 illustrates an example of detail circuitry for drive signal generator 72 and switching device 74.

Drive signal generator 72 is composed of identically constructed blocks 100, 102, . . . 104. Each block is provided with output signals from detector 70 and with the display erase signal via line 106. Block 100 comprises NOR gate 108 whose one input is supplied with signal C+1 while the other input is provided with a display erase signal via inverter 110 so that output D+1 is produced. On the other hand, one input of AND gate 112 is supplied with signal C−1 while the other input is provided with a display erase signal so that signal D−1 is produced.

Switching device 74 is composed of identically constructed blocks 114, 116, . . . 118. Block 114 includes P-type MOS FET 120 having the source electrode connected to the positive side of the power source, the gate electrode provided with signal D+1 and the drain electrode serving as the output terminal. On the other hand, the source electrode of N-type MOS FET 122 is connected to the negative side of the power source, the gate electrode is provided with signal D−1 and the drain electrode serves as the output terminal. The output of each block of switching device 114 is connected to each respective segment electrode 76*b*, 76*c*, . . . 76*d* of EC display device 76. The common electrode 76a is connected to GND at a potential mid-way between the positive and negative potential of the power source. Line 106 is connected to control terminal 68 either directly or through a differentiating circuit which will be subsequently described. The potential of line 106 is at a high logic level when the display erase signal is not in a state for inducing erasure of the display. Thus at this time signal D+1 is the inverse of signal C+1, and signal D−1 and signal C−1 are identical. When signal D+1 attains a low logic level, P-type MOS FET 120 is turned ON so that a current is caused to flow through segment electrode 76*b* (hereinafter referred to as segment 76*b*) in such a direction as induces a bleached state. When signal D−1 attains a high logic level, N-type MOS FET 122 is turned ON so that a current flows through segment 76*b* in a direction as induces a colored state. Signal C+1 attains a high logic level when signal B1 is detected to fall. Segment 76*b* accordingly attains a bleached state when signal B1 falls. Furthermore, signal C−1 attains a high logic level when signal B1 is detected to rise. Segment 76b accordingly attains a colored state when signal B1 rises. When the display erase signal attains a state for erasure of the display, line 106 is lowered to a low logic level. Since all of the output signals from drive signal generator 72 at this time attain a low logic level a current is caused to flow in a bleach-inducing direction through all of the segments of EC display device 76 so that the segments rapidly attain a bleached state. In other words, the display is completely erased. Since this erasure of the display is performed independently of the output signals from detector 70, the display can be completely erased even when the display as designated by the circuits and the display as indicated by the EC display device differ as is the case when a battery is replaced.

Figure 9:
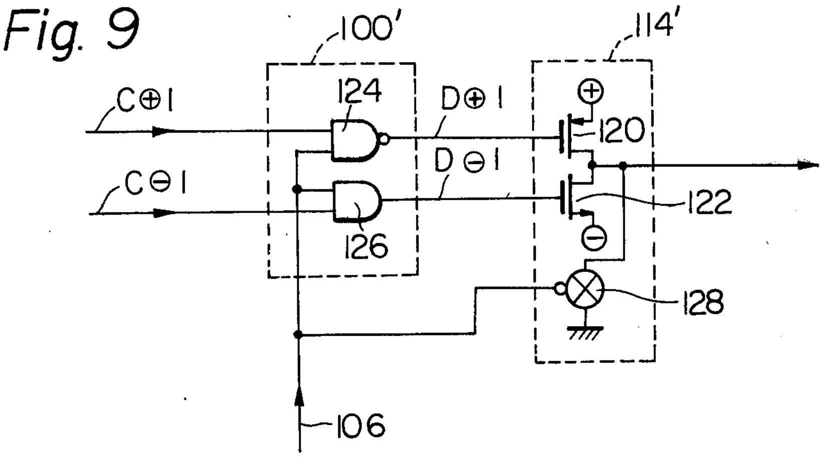
FIG. 9 is a modified form of the drive signal generator and the switching device shown in FIG. 8.

FIG. 9 illustrates a modified form of drive signal generator 72 and switching device 74 in which only portions corresponding to block 100 and block 114 of FIG. 8 are shown. In this modification, signal C+1 is applied to one input terminal of NAND gate 124 and the display erase signal is applied through line 106 to the other input terminal so that signal D+1 is produced. On the other hand, signal C−1 is applied to one input terminal of AND gate 126 and the display erase signal is applied to the other input terminal so that signal D−1 is produced. Block 114′ is similar to block 114 of FIG. 8 with a bi-directional electronic switch 128 added. Switch 128 is operative to connect one input to GND, the other input to the output terminal of block 114′, and the control terminal to line 106. Switch 128 is turned on when the potential of the control terminal is at a low logic level so that both inputs are allowed to pass; a high logic level turns the switch OFF. Since line 106 is at a high logic level when the display erase signal is not in a state which induces erasure, signal D+1 is the inverse of signal C+1, signal D−1 is identical to signal C−1, and switch 128 is turned OFF, whereby the operation of the circuit proceeds as in the circuit shown in FIG. 8. Since line 106 is at a low logic level when the display erase signal is in a state which induces erasure, signal D+1 attains a high level, signal D−1 a low logic level, and switch 128 is turned ON. At this time FETs 120 and 122 are turned OFF so that all the electrodes of the EC display device are connected to GND (i.e., short-circuited) thereby causing erasure of the entire display. When erasing the display in this manner by short-circuiting the electrode, the electrical charges stored on the EC display device are discharged without passing through the power source, thus reducing the amount of power required for erasing the display. A further advantage rests in the fact that the subsequent driving operation can be more readily performed since all of the electrodes have been brought to the same potential.

Figure 10:
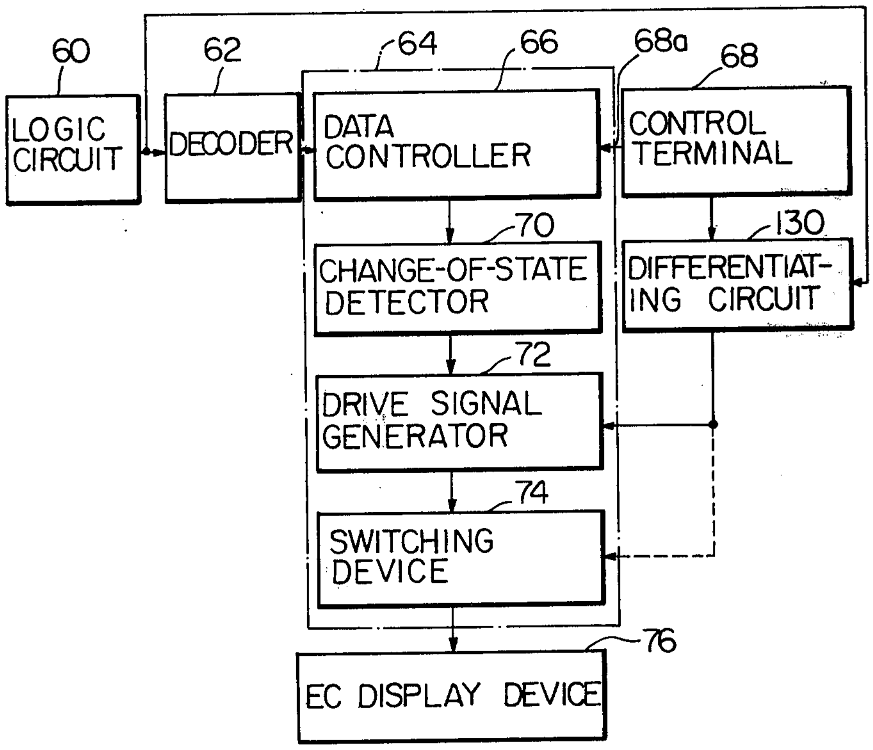
FIG. 10 is a block diagram of a further preferred embodiment of an electronic device according to the present invention.

FIG. 10 shows another preferred embodiment of a driver circuit for an electrochromic display device and like or corresponding component parts are designated by the same reference numerals as those used in FIG. 5. This illustrated embodiment differs from that of FIG. 5 in that a display erase signal from control terminal 68 is applied through differentiating circuit 130 to driver circuit 64. More specifically, control terminal 68 is connected to differentiating circuit 130 the output of which is applied to drive signal generator 72 of driver circuit 64. Control terminal 68 is also connected to data controller 66 through line 68*a*. The output of differentiating circuit 130 may be connected to switching device 74 as shown by a broken line. For a case in which the driver circuit is constructed as periodically cause a current to flow through the segments of the EC display device rather than inducing such flow only when the display is caused to undergo a change of state, line 68*a* which is used to by-pass the differentiating circuit and connect the control terminal directly to the data controller 66 may be dispensed with. The output signal from differentiating circuit 130 momentarily attains an active state for a short period in synchronizm with the display erase signal. Since a current will flow in a bleach-inducing direction through EC display device 76 in conformance to the duration of the output signal from the differentiating circuit, disruption of the EC display device due to an excessively large current as well as a wasteful consumption of energy can be avoided.

Figure 11:
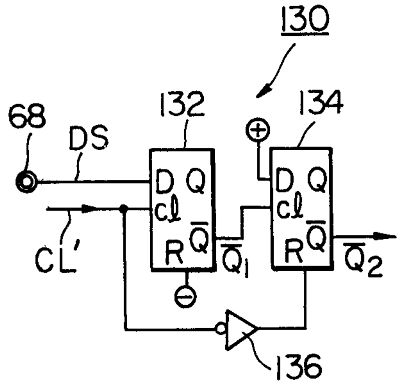
FIG. 11 is an example of a differentiating circuit forming part of the electronic device shown in FIG. 10.

FIG. 11 shows an example of differentiating circuit 130. The data input terminal D of data type flipflop (hereinafter referred to as D-FF) 132 is connected to control terminal 68, a clock signal CL′ delivered from logic circuit 60 is applied to clock input terminal C1, and reset input terminal R is connected to a negative potential −. Terminal D of D-FF 134 is connected to a positive potential +, signal $\overline{Q_1}$ which is the output signal $\overline{Q}$ produced by D-FF 132 is applied to terminal C1, the clock signal CL′ is applied to reset terminal R across inverter 136, and an output signal $\overline{Q_2}$ is produced at the $\overline{Q}$ output terminal of D-FF 134. The operation of D-FF 132 and 134 may be understood from the following table:

Table 3

| Cl | D | R | $Q_n$ | $\overline{Q_{n-1}}$ |
|---|---|---|---|---|
| ↑ | H | L | H | L |
| ↑ | L | L | L | H |
| ↓ | X | L | $Q_{n-1}$ | $\overline{Q_{n-1}}$ |
| X | X | H | L | H |

Figure 12:
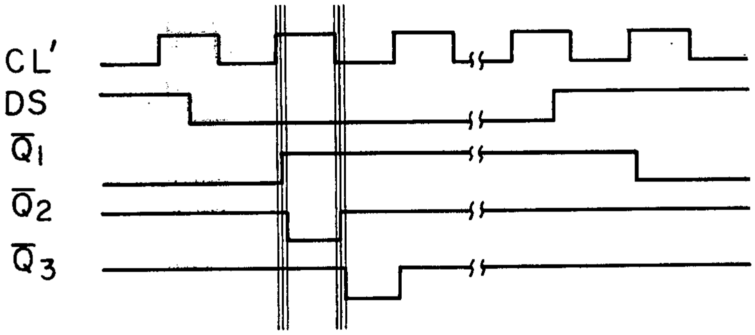
FIG. 12 is a timing chart for illustrating the operation of the circuit shown in FIG. 11.

When the differentiating circuit shown in FIG. 11 is provided with a clock signal CL′ and display erase signal DS as shown in FIG. 12, an output signal $\overline{Q_2}$ is produced. When the signal DS attains a low logic level which initiates erasure of the display, signal $\overline{Q_2}$ after a slight delay attains a low logic level for a short period of time which is the signal for inducing display erasure. The signal $\overline{Q_2}$ is applied to drive signal generator 72 via line 106 (see FIG. 8) to cause NOR gate 108 to produce a bleaching signal to induce display erasure. Accordingly when signal $\overline{Q_2}$ is at a low level a current is caused to flow in a direction as will induce a bleached state or all the electrodes of the EC display device are short-circuited so that the entire display is erased. By setting the pulse width of signal $\overline{Q_2}$ to a certain value which is shorter than that of the display erase signal DS it is possible to avoid an excess flow of current through the EC display device.

Figure 13:
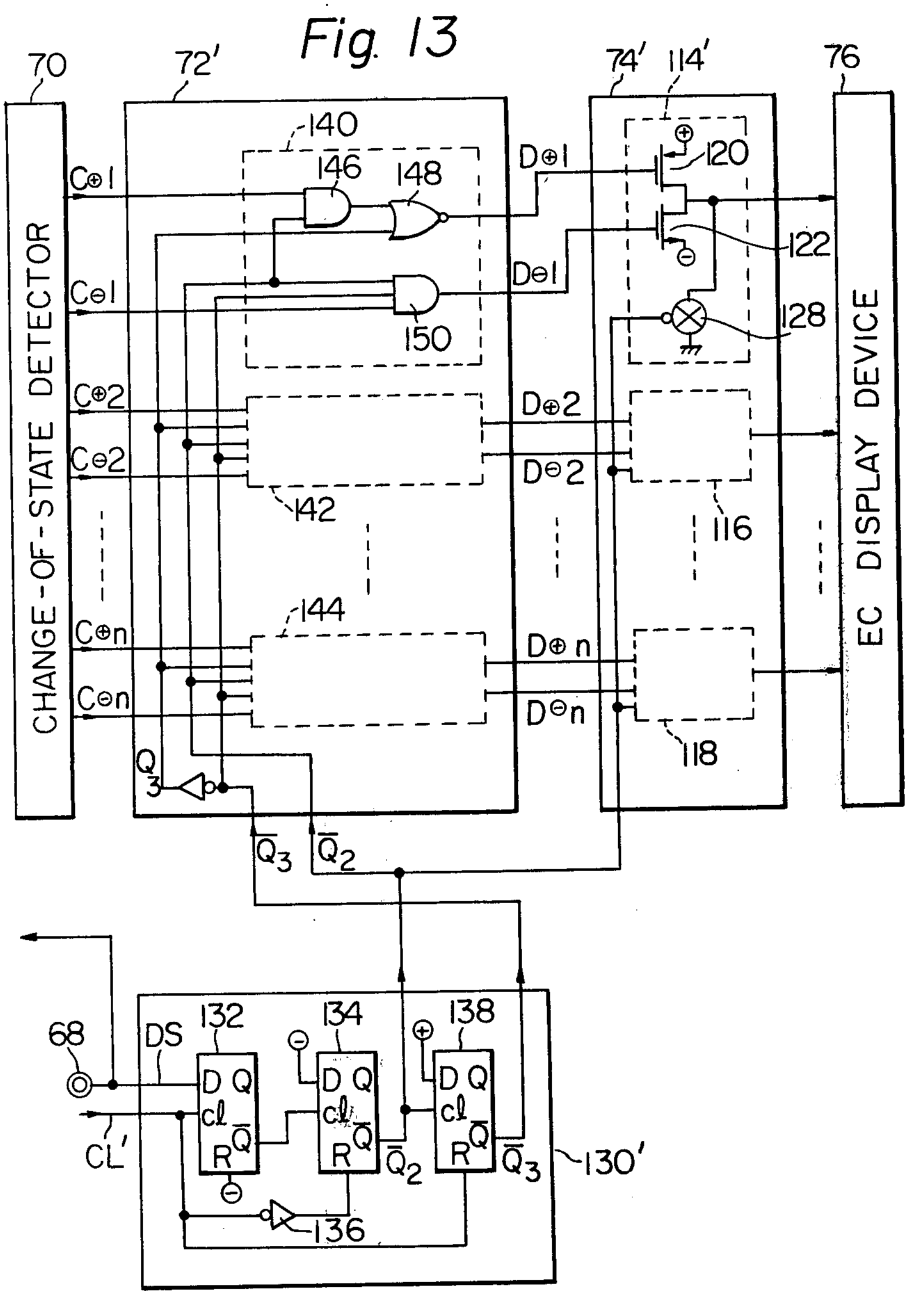
FIG. 13 is another example of the differentiating circuit shown in FIG. 11 and shows an example of detail circuitry for a drive signal generator connected to the differentiating circuit.

FIG. 13 illustrates another example of the differentiating circuit and the drive signal generator. Here an example is given in which a current is caused to flow in a bleach-inducing direction through all of the segments of EC display device 76 after all of the electrodes have been short-circuited. Differentiating circuit 130′ is similar to the differentiating circuit shown in FIG. 11 with D-FF 138 added. Terminal D of D-FF 138 is connected to a positive potential +, signal $\overline{Q_2}$ is applied to clock terminal C1, and a clock signal CL′ is applied to reset terminal R. According to this construction, a signal $\overline{Q_3}$ is produced as illustrated by the waveform $\overline{Q_3}$ in FIG. 12. Signal $\overline{Q_2}$ is used as a signal for short-circuiting the electrodes of EC display device 76 and signal $\overline{Q_3}$ is used as a signal for causing a current to flow through the segments of the EC display device in a direction as will bleach them.

Drive signal generator 72′ is composed of identically constructed blocks 140, 142, . . . 144 each of which produces D signals as outputs applied to switching device 74′ whenever the blocks are provided with their corresponding C signals as well as with signals $\overline{Q_2}$, $Q_3$ and $\overline{Q_3}$. According to the construction of block 140, signal C+1 is applied to one input of AND gate 146 and signal $\overline{Q_2}$ is applied to the other input. The output of AND gate 146 is applied to one input of NOR gate 148 and signal $Q_3$ is applied to the other input so that an output signal D+1 is produced. Signal $\overline{Q_2}$ is applied to one input of AND gate 150, signal $\overline{Q_3}$ is applied to the second input and signal C−1 is applied to the third input, whereby an output signal D−1 is produced.

Switching device 74 is constructed of switching blocks one of which is shown in FIG. 13. The operation for cases in which the display erase signal applied to the control terminal is at a high level is as described for the circuit shown in FIG. 9. When the display control signal DS does attain a state which initiates erasure, signal $\overline{Q_2}$ attains a low logic level as shown in FIG. 12. At this time signal $\overline{Q_3}$ attains a high level so that signals D+1, D+2, . . . D+n all attain a high level and signals D−1, D−2, . . . D−n all attain a low level. As a result all P- and N-type MOS FETs corresponding to P-type FET 120 and N-type FET 122 remain in OFF state and all bi-directional electronic switching groups corresponding to bi-directional switch 128 are turned ON, whereby all electrodes of the EC display device 76 are short-circuited. Next, when signal $\overline{Q_2}$ attains a high level and signal $\overline{Q_3}$ a low level, all D signals are lowered to a low level. As a result, all the P-type MOS FETs corresponding to P-type FET 120 are turned ON and all the N-type MOS FETs corresponding to N-type MOS FET 122 remain in OFF state and all the bi-directional electronic switching groups corresponding to bi-directional switch 128 are turned OFF. Thus a current is caused to flow through all the segments of EC display device 76 in such a direction as will bring them to a bleached state.

The driver circuit as thus described with reference to FIG. 13 requires a relatively smaller amount of electric power for erasing the display and enables such erasure to be performed in a rapid manner. Another advantage is the fact that the subsequent driving operation can be more readily performed since all of the electrodes have been brought to the same potential. Furthermore, the durations during which signals $\overline{Q_2}$ and $\overline{Q_3}$ are in an erase-inducing state can be freely varied by suitably selecting the width of the clock signal. In addition, the duration of the erase-inducing state of signals $\overline{Q_2}$ and $\overline{Q_3}$ can be made to differ by using a plurality of clock signals to control D-FF 132, 134 and 138.

It is apparent from the above description that the driver circuit is particularly suitable for electronic devices such as electronic time pieces and portable calculators which use batteries and thus must not consume large amounts of power.

Figure 14:
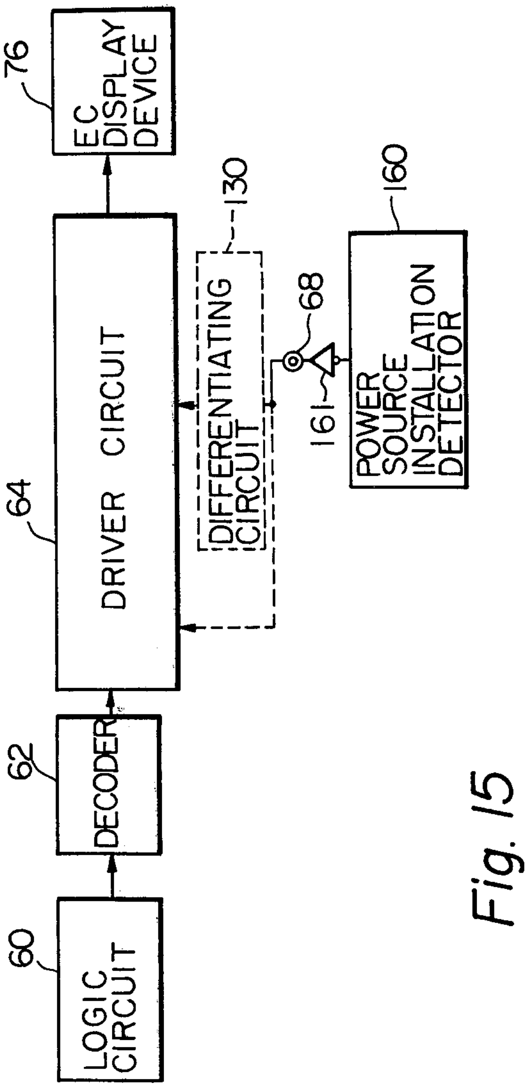
FIG. 14 is a block diagram of a modified form of the electronic device shown in FIG. 10.

FIG. 14 shows a modified form of a circuit of FIG. 10 in which erasure of a display is automatically performed when a power source is installed or connected into the circuit. By connecting the output of power source installation detector 160 via inverter 161 to control terminal 68, an output signal from detector 160 serves as a display erase signal which erase the entire display when a power source is installed.

In FIG. 14, the necessity of differentiating circuit 130 is determined by the duration of said detection signal. For cases in which control terminal 68 is connected to the output of the power source installation detector, it is not always necessary to provide a control terminal, as an external terminal for the driver circuit.

Figure 15:
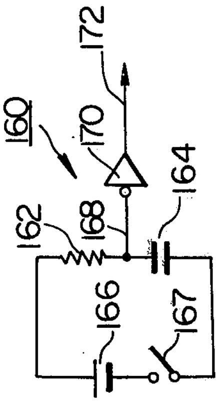
FIG. 15 is an example of a power source installation detector forming part of the electronic device shown in FIG. 14.
Figure 16:
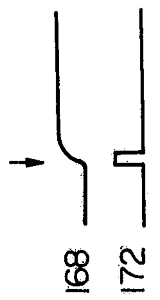
FIG. 16 is a timing chart for the circuit shown in FIG. 15.

FIG. 15 illustrates an example of a power source installation detector, and FIG. 16 shows the corresponding timing chart for a description of the operation of the detector.

In FIG. 15, an integrating circuit is constructed by connecting a resistor 162 and a condensor 164 in series across a power source 166. The output of the circuit is applied across line 168 to inverter 170 the output of which appears as a detection signal at line 172. When power source 166 is connected into the circuit switch 167 is closed and the potential as seen at line 168 gradually rises as shown in FIG. 16 so that a corresponding detection signal appears at line 172 also as shown.

Figure 17:
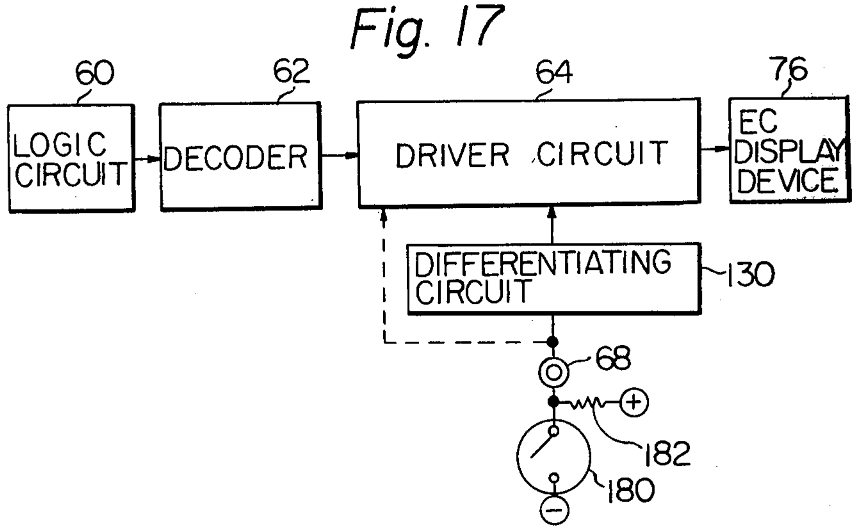
FIG. 17 is a block diagram of another modified form of the electronic device shown in FIG. 10.

FIG. 17 shows an example in which display erasure is performed by means of an external control member. Here an external control member 180 and a resistor 182 are connected to control terminal 68. As external control member 180 is normally in an OPEN state terminal 68 is generally held at a positive potential. When the display is to be erased, control member 180 is closed so as to bring terminal 68 to a negative potential and thus erase the display.

Thus by connecting the external control member to the control terminal it is possible to conserve energy and prevent a lingering indistinct display since the display is completely erased when it is no longer required.

Figure 18:
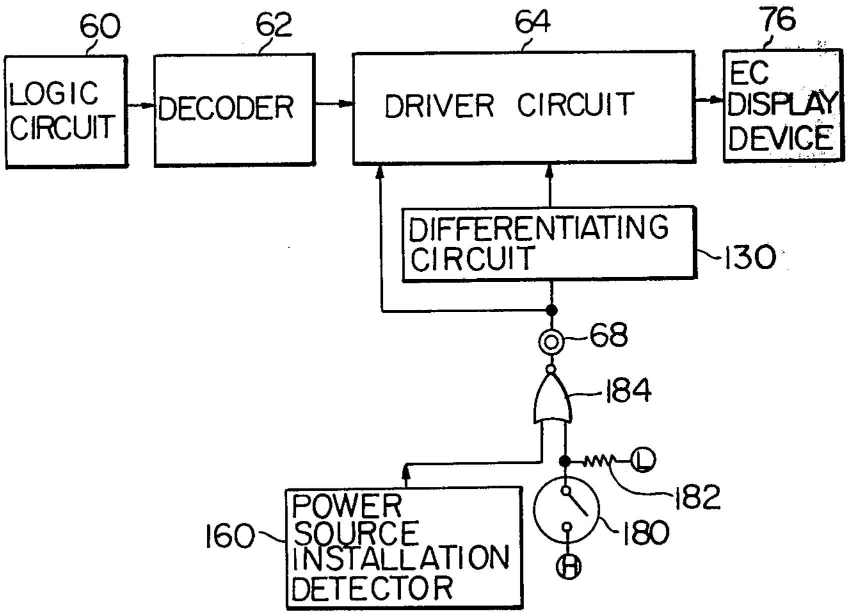
FIG. 18 is a block diagram of a further modified form of the electronic device shown in FIG. 10.

FIG. 18 shows an example for a case in which erasure of the display is performed by both external control member 180 and power source installation detector 160. A signal which is the logical sum of the detection signal produced by detector 160 and the output signal provided by external control member 180 is produced by NOR gate 184 which applies an output signal as a display erase signal to control terminal 68. According to such a construction the display can be automatically erased when a battery is replaced while power consumption can be reduced and a lingering display avoided when a display is no longer necessary.

It will now be appreciated from the foregoing description that in accordance with the present invention it is possible to selectively erase the entire display of an EC display device with a simplified circuit arrangement whereby erroneous display of information can be avoided in a highly reliable manner. It should also be understood that a driver circuit of the present invention makes it possible to reduce power consumption required by an EC display device.

While the present invention has been shown and described with reference to particular embodiments by way of example, it should be noted by various other changes or modifications may be made without departing from the scope of the present invention.

What is claimed is:

1. In an electrochromic display device includng a common electrode and a plurality of segment electrodes, a driver circuit having a power source and connected to a decoder adapted to provide display information signals, comprising:

a drive signal generator for generating coloring and bleaching signals in response to first and second changes in state of each of said display information signals;

a switching device composed of complementary MOSFETs connected between power source and said segment electrodes and responsive to said coloring and bleaching signals to cause an electric current from said power source to flow through said segment electrodes in directions to induce colored and bleached states, respectively;

means for applying a display erase signal; and data control circuit coupled between said decoder and said drive signal generator to normally pass said display information signals to said drive signal generator, said data control circuit being responsive to said display erase signal to block said display information signals being applied to said drive signal generator, whereby said drive signal generator simultaneously generates a plurality of bleaching signals to cause said complementary MOSFETs of said switching device to apply an electric current from said power source simultaneously to all of said segment electrodes which have previously been in a colored state in a direction to induce bleached state for thereby automatically erasing displaying data.

2. A driver circuit as claimed in claim 1, in which said data control circuit comprises a plurality of gate means each of which has one input coupled to an output of said decoder and the other input coupled to an output of said applying means.

3. A driver circuit as claimed in claim 1, in which said complementary MOSFETs comprise a P-channel metal oxide semi-conductor field-effect transistor having its source terminal coupled to the high potential side of said power source and its gate terminal coupled to said drive signal generator to receive said bleaching signal, and an N-channel metal oxide semi-conductor field-effect transistor having its source terminal coupled to the low potential side of said power source and its gate terminal coupled to said drive signal generator to receive said coloring signal, drain terminals of said transistors being connected to one of said segment electrodes of said electrochromic display device.

4. A driver circuit as claimed in claim 1, in which said applying means comprises a switch which is normally connected to one potential side of said power source and generates an output signal when said switch is connected to another potential side of said power source, and a synchronizing circuit coupled to said switch for synchronizing said output signal with a clock signal to generate said display erase signal in synchronism with said clock signal.

5. A driver circuit as claimed in claim 4, in which said drive signal generator comprises a plurality of latch circuits for storing said display information signals and each generating first and second output signals delayed in phase from each of said display information signals, first gate means responsive to said second output signal and said each of said display information signals to generate said coloring signal, and second gate means responsive to said first output signal and said each of said display information signal to generate said bleaching signal.

6. A driver circuit as claimed in claim 1, further comprising a change-of-state detector coupled between said data control circuit and said drive signal generator and detecting a change in state of an output of said data control circuit for thereby generating a first output signal in response to a first change in state of said output of said data control circuit and a second output signal in response to a second change in state of said output of said data control circuit, said drive signal generator being responsive to said first and second output signals to generate said coloring and bleaching signals, respectively.

7. A driver circuit as claimed in claim 6, in which said drive signal generator comprises first gate means responsive to said first output signal to generate said coloring signal, and second gate means responsive to said second output signal to generate said bleaching signal.

8. A driver circuit as claimed in claim 7, in which said first gate means comprises an AND gate having its one input coupled to said change-of-state detector to receive said first output signal and the other input coupled to said applying means, and said second gate means comprises a NOR gate having its one input coupled to said change-of-state detector to receive said second output signal and the other input coupled through an inverter to said applying means.

9. A driver circuit as claimed in claim 7, in which said first gate means comprises an AND gate having its one input coupled to said change-of-state detector to receive said first output signal and the other input coupled to said applying means, and said second gate means comprises NAND gate having its one input coupled to said change-of-state detector to receive said second output signal and the other input coupled to said applying means, and further comprising additional switching means coupled between said electrochromic display device and a ground, said additional switching means being conductive in response to said display erase signal to cause the electrodes of said electrochromic display device to be short-circuited to erase a display therefrom.

10. A driver circuit as claimed in claim 1, in which said applying means comprises a power source installation detector which generates a detection signal as said display erase signal when said power source is installed.

11. In an electrochromic display device for an electronic timepiece including a logic circuit adapted to provide logic information signals, and a decoder coupled to said logic circuit to provide display information signals in response to said logic information signals, said electrochromic display device including a common electrode and a plurality of segment electrodes, a driver circuit comprising:

a drive signal generator coupled to said decoder for generating coloring and bleaching signals in response to first and second changes in state of each of said display information signals;

a switching device composed of complementary MOSFETs connected between a power source and said segment electrodes and responsive to said coloring and bleaching signals to cause an electric current from said power source to flow through said segment electrodes in directions to induce colored and bleached states, respectively;

a control terminal for inputting a display erase signal therefrom; and data control circuit coupled between said decoder and said drive signal generator to normally pass said display information signals to said drive signal generator, said data control circuit being responsive to said display erase signal to block said display information signals being applied to said drive signal generator, whereby said drive signal generator simultaneously generates a plurality of bleaching signals to cause said complementary MOSFETs of said switching device to apply an electric current from said power source simultaneously to all of said segment electrodes which have previously been in a colored state in a direction to induce bleached state for thereby automatically erasing a display from said display device.

12. A driver circuit as claimed in claim 11, further comprising a differentiating circuit coupled to said control terminal for generating an output signal which momentarily attains an active state for a short period of time in synchronism with said display erase signal.

13. A driver circuit as claimed in claim 12, in which said output signal generated by said differentiating circuit is applied to said drive signal generator, whereby said drive signal generator generates said bleaching signal for a short period of time.

14. A driver circuit as claimed in claim 12, in which said differentiating circuit comprises a first data-type flip-flop coupled to said control terminal, and a second data-type flip-flop coupled to an output of said first data-type flip-flop to generate said output signal delayed in phase from said display erase signal.

15. A driver circuit as claimed in claim 14, in which differentiating circuit further comprises a third data-type flip-flop coupled to an output of said second data-type flip-flop to provide an additional output signal on its output.

16. A driver circuit as claimed in claim 15, in which said switching device is responsive to said output signal from said second data-type flip-flop to cause the electrodes of said electrochromic display device to be short-circuited, and in which said drive signal generator is responsive to said additional output signal from said third data-type flip-flop to generate said bleaching signal after said electrodes have been short-circuited.

17. A driver circuit as claimed in claim 11, further comprising a power source installation detector coupled to said control terminal, said detector including means for generating a detection signal when said power source is installed, said detection signal is applied through said control terminal as said display erase signal.

18. In an electrochromic display device for an electronic timepiece including a logic circuit adapted to provide logic information signals, and a decoder coupled to said logic circuit to provide display information signals in response to said logic information signals, said electrochromic display device including a common electrode and a plurality of segment electrodes, a driver circuit comprising:

a drive signal generator coupled to said decoder for generating coloring and bleaching signals in response to first and second changes in state of each of said display information signals;

a switching device composed of complementary MOSFETs connected between a power source and said segment electrodes and responsive to said coloring and bleaching signals to cause an electric current from said power source to flow through said segment electrodes in directions to induce colored and bleached states, respectively;

a control terminal for inputting a display erase signal therefrom;

a power source installation detector coupled to said control terminal and including detection means for generating said display erase signal when said power source is installed into said electronic timepiece; and data control circuit coupled between said decoder and said drive signal generator to normally pass said display information signals to said drive signal generator, said data control circuit being responsive to said display erase signal to block said display information signals being applied to said drive signal generator, whereby said drive signal generator simultaneously generates a plurality of bleaching signals to cause said complementary MOSFETs of said switching device to apply an electric current from said power source simultaneously to all of said segment electrodes in a direction to induce bleached state for thereby automatically erasing a display from said display device when said power source is installed into said electronic timepiece.

19. A driver circuit as claimed in claim 18, further comprising a differentiating circuit coupled to said control terminal for generating an output signal which momentarily attains an active state for a short period of time in synchronism with said display erase signal.

20. A driver circuit as claimed in claim 18, in which said power source installation detector comprises a resistor and a capacitor connected in series across the power source to form an integrating circuit, and an inverter having its input coupled to an output of said integrating circuit and an output coupled to said control terminal.

21. A driver circuit as claimed in claim 18, in which said control terminal is coupled through a resistor to one potential side of said power source, and further comprising an external control member which is normally open, said external control member being connectable to another potential side of said power source to provide said display erase signal when said power source is installed.

* * * * *